(12) United States Patent
Duncan et al.

(10) Patent No.: US 6,170,439 B1
(45) Date of Patent: Jan. 9, 2001

(54) REMOTE CONTROLLED ANIMAL TRAINING SYSTEM

(75) Inventors: Timothy T. Duncan; Steven R. Fister; Rodney J. Morris; Robert D. Rozanski, all of Tucson, AZ (US)

(73) Assignee: Tri-Tronics, Inc., Tucson, AZ (US)

( * ) Notice: Under 35 U.S.C. 154(b), the term of this patent shall be extended for 0 days.

(21) Appl. No.: 09/339,491

(22) Filed: Jun. 24, 1999

(51) Int. Cl.$^7$ .............................. A01K 15/00; G08B 23/00
(52) U.S. Cl. ....................... 119/720; 119/859; 119/908; 340/573.3
(58) Field of Search ................................... 119/720, 719, 119/859, 908; 340/573.1, 573.3; 341/176, 177, 178, 182

(56) References Cited

U.S. PATENT DOCUMENTS

| | | | |
|---|---|---|---|
| 4,802,482 | 2/1989 | Gonda et al. ........................... | 119/29 |
| 5,054,428 | 10/1991 | Farkas ..................................... | 119/29 |
| 5,471,954 | 12/1995 | Gonda et al. ......................... | 119/859 |
| 5,666,908 | 9/1997 | So ....................................... | 119/720 |
| 5,769,032 | * 6/1998 | Yarnall, Sr. et al. ................ | 119/721 |
| 6,003,474 | * 12/1999 | Slater et al. .......................... | 119/859 |
| 6,052,097 | * 4/2000 | Duncan et al. ....................... | 343/788 |
| 6,064,308 | * 5/2000 | Janning et al. .................... | 340/573.3 |

* cited by examiner

*Primary Examiner*—Peter M. Poon
*Assistant Examiner*—Yvonne R. Abbott
(74) *Attorney, Agent, or Firm*—Cahill, Sutton & Thomas P.L.C.

(57) ABSTRACT

An animal is trained using a remote transmitter and a collar-mounted receiver carried by the animal by selecting one of a plurality of desired stimulus levels by a stimulus level control of the transmitter. Information representative of the selected desired stimulus level is transmitted to the receiver and demodulated to produce a digital signal representative of the selected stimulus level. A microprocessor in the receiver operates to generate as an output a first stream of pulses of constant duration at a frequency representative of the selected stimulus level. The first stream of output pulses is filtered to produce a second stream of pulses the widths of which are representative of the selected stimulus level. The second stream of pulses is applied to the control electrode of a switch coupled in series with a primary winding of an output transformer of the receiver to repetitively turn the switch on for durations equal to the width of the pulse of the second stream and causes the amplitude of voltage pulses produced between contact electrodes connected to terminals of the secondary winding of the output transformer to be representative of the selected stimulus level.

22 Claims, 8 Drawing Sheets

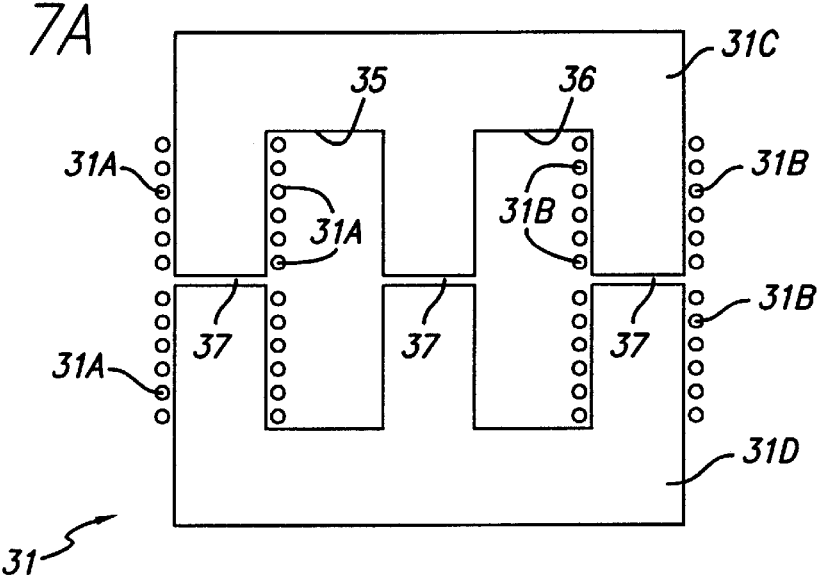
FIG. 7A
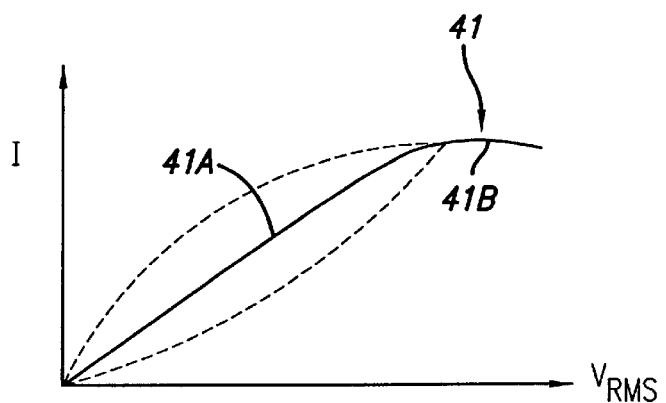
FIG. 7B
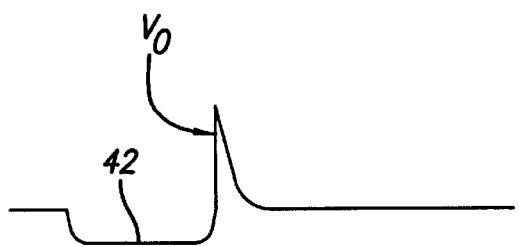
FIG. 7C
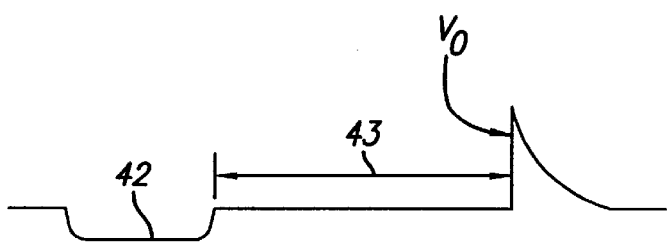

REMOTE CONTROLLED ANIMAL TRAINING SYSTEM

BACKGROUND OF THE INVENTION

The invention relates to systems for reliable remote control of animal training stimulus signals, and more particularly to a system that (1) provides remote control of the amplitude of stimulus pulses when the electrodes are in contact with the skin of an animal, and (2) also provides remote control of the amplitude of open circuit output voltages applied between stimulus electrodes (i.e., when the electrodes are not in electrical contact with the skin of the animal).

Prior art FIG. 1, which is a copy of FIG. 2A of U.S. Pat. No. 5,666,908, discloses a receiver unit having an antenna 212 that receives an rf signal containing a code representing one of a number of possible levels of stimulation selectable by a switch on a remote transmitter (not shown). The rf signal is detected and demodulated by receiver 210 and a "detector" or demodulator 220. The demodulated code is serially input to microprocessor 230 and stored in memory 231 thereof. Microprocessor 230 executes a program to produce output pulses at node 236. The widths PW of such output pulses (shown in waveform 350 in FIG. 3 of the '908 patent) correspond precisely to the one of the possible stimulus levels represented by the stored code. The width PW of each pulse determines how long the transformer primary winding switch transistor 260 is turned on in response to each output pulse, and thereby determines the peak-to-peak magnitude of the resulting pulse produced between electrodes 286 and 288 when transistor 260 is turned off at the end of the pulse. The greater the pulse width PW, the more energy is stored in the core material of the transformer, and the higher the peak-to-peak flyback or stimulus voltage is between electrodes 286 and 288 immediately after transistor 260 is turned off at the end of each pulse.

A basic requirement of a remote training device of the general type including stimulus intensity controllable by a remote transmitter is that each remotely selected intensity level must reliably and consistently apply the same electrical stimulus level to the animal being trained. If this requirement is not met, inconsistent stimulus levels received by the animal often cause confusion to the animal, which interferes with the training process.

A shortcoming of the closest prior art remote training systems having remotely selectable control of the amplitude of the stimulus signal between the skin-contacting electrodes is that for the lower values of the intensity settings, neither the open circuit nor the "loaded" electrode voltages applied between the contacting electrodes are high enough to cause effective electrical contact of the electrodes with the animals' skin. The animal does not feel and therefore does not respond to the intended stimulus for lower selected intensity control settings. A trainer observing the lack of response then is likely to increase the selected stimulus level on the remote transmitter until the animal responds. At that point, the stimulus level actually felt by the animal may suddenly be much higher than is justified by its behavior and may be far too great, causing confusion or fright of the animal which, of course, is counterproductive.

The foregoing problems may be caused by a combination of the dryness of the animals' skin, the tightness of the collar pressing the electrodes against the animals' skin, and various other conditions that cause or contribute to ineffective electrical contact of the electrodes with the animals' skin. The only known reliable way of nevertheless ensuring electrical contact of the electrodes to the animals' skin is to ensure that the open circuit output voltage produced by the secondary winding of the output transformer in the receiver is high enough to arc across any gap or insulative barrier between the electrodes and the animals' skin.

Commonly assigned U.S. Pat. No. 4,802,482, by Gerald J. Gonda and Gregory J. Farkas, issued Feb. 7, 1989, and incorporated herein by reference, and commonly assigned U.S. Pat. No. 5,054,428, by Gregory J. Farkas, issued Oct. 8, 1991, also incorporated herein by reference, disclose prior remote animal training systems in which intensity of electrical stimulus is remotely controlled by causing the receiver circuits to produce various stimulus waveforms of constant amplitude and selectable duration and/or frequency. The high open circuit stimulus voltage needed is achieved independently of the intensity level selected. The devices disclosed in these patents provide reliable electrical contact of the electrodes to the skin of the animal being trained by providing sufficiently high open circuit voltages to ensure that even low levels of stimulation produced by controlling the output pulse widths and repetition rates are reliably felt by the animal. However, it has been discovered that even though the circuitry disclosed in the foregoing patents is capable of providing the stimulus voltage with a very wide range of selectable pulse widths and pulse frequencies, the physiology of the dogs being trained is such that the effective range of remotely selectable stimulus that can be achieved by adjusting only the pulse widths and repetition rates of the electrode pulses is much less than is desirable for a wide range of training conditions.

Therefore, it has been necessary for professional trainers and others to either manually swap pluggable intensity-level-setting resistors or manually swap resistive contact electrodes (of the type described in commonly assigned U.S. Pat. No. 5,471,954, issued Dec. 5, 1995) to provide the needed range of remotely controllable stimulus intensity.

Because of the lack of a wide range of nearly immediately selectable stimulus levels in the prior art remote training devices, professional trainers have had to plan particular training sessions so as to include only activities and circumstances likely to cause dog behaviors which would require stimulus levels within the range determined by the pluggable intensity-level-setting resistors and/or the resistive electrodes on the collar mounted receiver unit. Then, if unexpected behavior or unexpected circumstances occurred during the training session, the trainer often was not able to immediately select a high, effective stimulus level. In such a case, an opportunity for effective training was lost, and the training process may have been set back as a result of inconsistent and/or inappropriate stimulus.

It would be very desirable to be able to provide remotely controlled stimulus levels that can be promptly changed to any desired level within a very broad range so that a trainer can immediately provide stimulus levels appropriate to any dog behavior likely to occur in any environmental circumstance likely to occur during any training session.

And as previously indicated, the other prior remote training systems (such as ones based on above mentioned U.S. Pat. No. 5,666,908) that provide remote control of the amplitude of stimulus pulses applied to a dog, have failed to provide reliable electrical stimulus for the entire range of remote intensity level settings, especially for the lower intensity level settings.

Thus, there is an unmet need for an improved remote training device that reliably provides a very wide range of remotely adjustable, consistent intensity levels under a wide variety of different training conditions, with no need to manually modify or manually interchange intensity-setting components on the receiver unit. There is an unmet need for a remote training device that (1) provides maximum selectability of the intensity of stimulus applied to the animal, and (2) also achieves very reliable, repeatable electrical contact of the electrodes with the animal's skin over the entire desired range of selectable stimulus intensity settings.

The receiver circuitry of some prior collar-mounted receivers for remote animal training systems has driven the output transformer into saturation. This has resulted in very non-linear, unpredictable amplitudes of the stimulus pulses produced by the secondary winding of the transformer.

The present assignee has marketed prior art "beeper" devices which are carried on separate collars. The beeper devices include internal motion sensors that determine whether the dog is running or standing motionless and accordingly emit relatively loud beeping sound patterns that indicate to the trainer whether the dog is moving or "pointing". This enables the trainer to take this information into account in determining what, if any, remotely controlled stimulus should be provided to the dog. Such prior art beeping devices have not been remotely controlled.

SUMMARY OF THE INVENTION

Accordingly, it is an object of the invention to provide a remote control animal training system that applies reliable, consistent, accurate, and repeatable stimulus signals to an animal, especially a dog, with a wide range of remotely selectable intensity.

It is another object of the invention to provide a remote control animal training system that provides a very wide range of reliable, consistent, and repeatable stimulus signals of remotely selectable intensity to an animal without having to manually swap or adjust intensity-setting components on a receiver unit carried by the animal.

It is another object of the invention to provide an improved remote control dog training system and technique that allows a trainer to avoid the above mentioned need to limit a training session to a narrow range of activities that is determined by a narrow range of available remotely selectable stimulus intensity levels.

It is another object of the invention to provide such selectable, consistent, and repeatable stimulus levels more effectively and more efficiently than the closest prior art.

It is another object of the invention to avoid radio frequency interference from the output transformer of a remote controlled animal training device with reception of control signals by the receiver thereof.

It is another object of the invention to provide a remote animal training system with a reliable way for a trainer to monitor whether a dog is moving or motionless when the dog is out of sight.

Briefly described, and in accordance with one embodiment thereof, the invention provides a system and method for training an animal using a remote transmitter and a collar-mounted receiver carried by the animal by selecting one of a plurality of desired stimulus levels by means of a stimulus level control of the transmitter. Information representative of the selected desired stimulus level is transmitted to the receiver. The received information is demodulated in the receiver to produce a digital signal representative of the selected stimulus level. A microprocessor in the receiver receives and operates on the digital signal to generate on an output bus of the microprocessor a first stream of pulses of constant duration at a frequency representative of the selected stimulus level. The first stream of output pulses is filtered to produce a second stream of pulses the widths of which are representative of the selected stimulus level. The second stream of pulses is applied to the control electrode of a switch coupled in series with a primary winding of an output transformer of the receiver to repetitively turn the switch on for durations equal to the width of the pulse of the second stream to cause the amplitude of voltage pulses produced between contact electrodes connected to terminals of the secondary winding of the output transformer to be representative of the selected stimulus level.

BRIEF DESCRIPTION OF THE DRAWINGS

FIG. 7A is a diagram of the output transformer 31 of FIG. 3.

FIG. 7B is a graph of the primary winding current versus time for the output transformer shown in FIG. 7A.

FIG. 7C is a diagram illustrating the effect of an air gap in the transformer core structure shown in FIG. 7A upon the output pulses produced by the transformer.

DETAILED DESCRIPTION OF THE PREFERRED EMBODIMENTS

Figure 1:
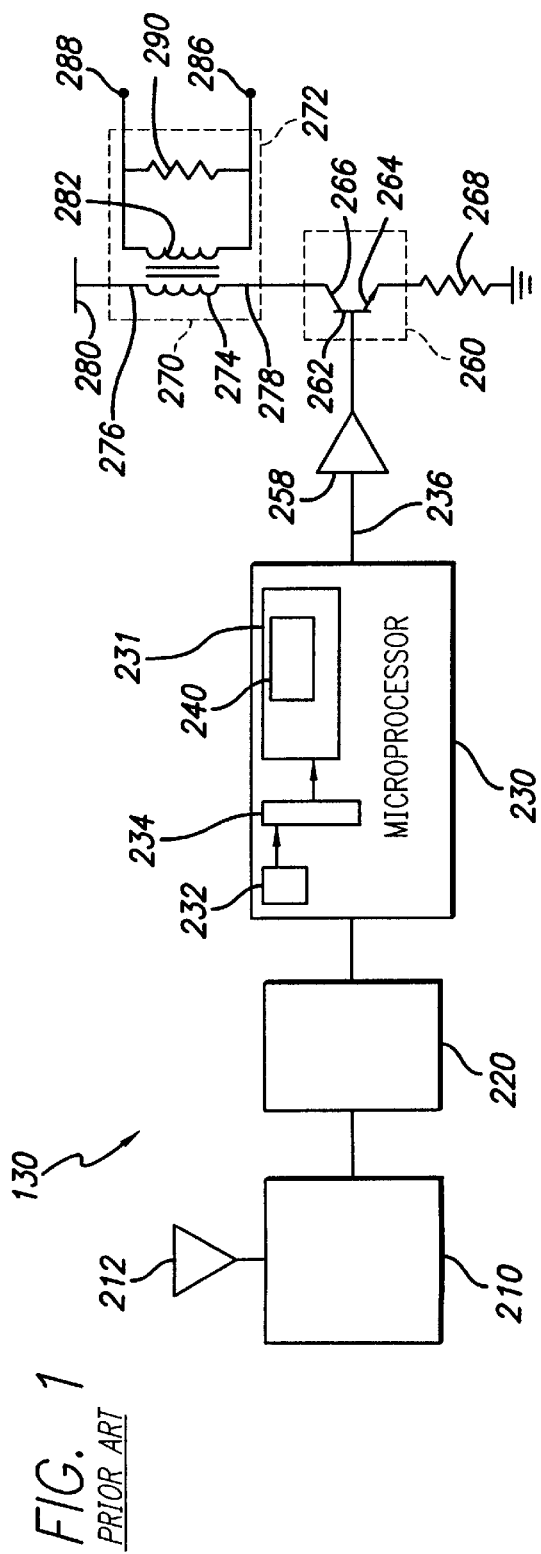
FIG. 1 is a block diagram of a prior art remote animal training system.
Figure 2:
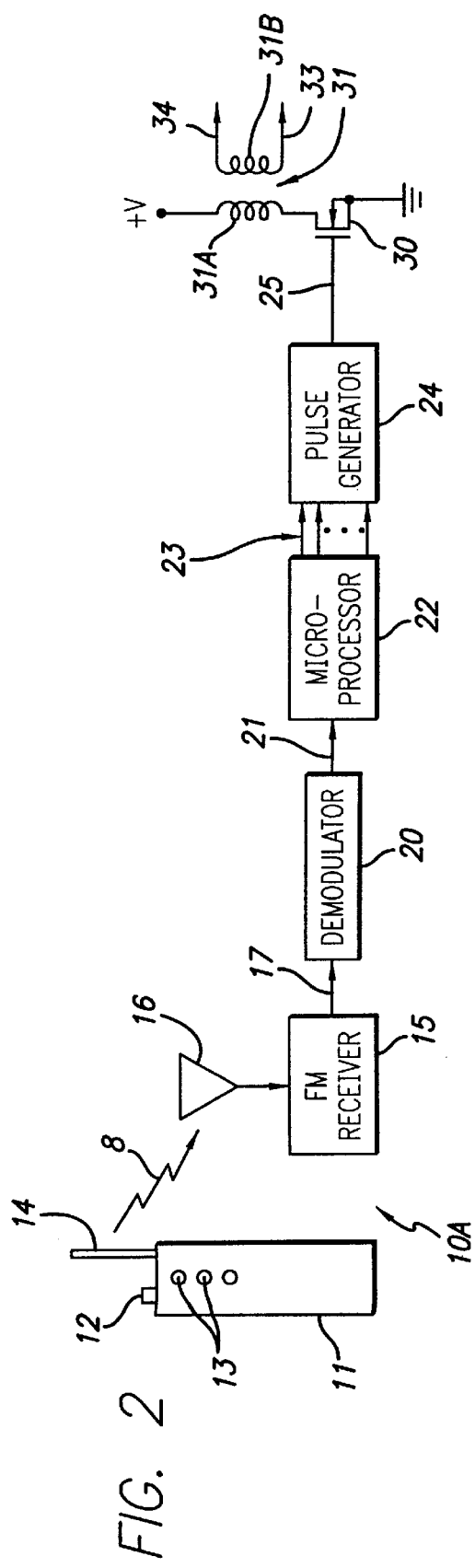
FIG. 2 is a block diagram of a first embodiment of the remote animal training system of the present invention.

Referring to FIG. 2, a first remote training system 10A includes a remote transmitter 11 having several push-button switches 13 for setting a stimulus level code that selects one of six desired electrode stimulus signal levels. The stimulus level selected is digitally encoded into an rf signal 8 that is transmitted by an antenna 14 on transmitter 11 to the antenna 16 and detected by an FM receiver 15. The output 17 of receiver 15 then is demodulated by a demodulator 20 to produce a digital output 17 that represents the remotely selected stimulus level code. The digital output 21 of demodulator representing the stimulus code selected by push-button switches 13 of transmitter 11 then is translated by a microprocessor 22 into one of six possible stimulus level selection signals 23. All of the stimulus level selection signals 23 produced by microprocessor 22 have the same pulse width. Intensity selector switch 12 provides six settings for selecting one of six available intensity levels.

The stimulus level selection signal 23 produced by microprocessor 22 is applied to a corresponding input of a pulse generator state machine 24. State machine 24 operates on the constant-width stimulus level selection signals 23 produced by microprocessor 22 to produce a drive signal 25 consisting of drive pulses the widths of which are determined by which of the six available stimulus level selection signals 23 is applied to pulse generator circuit 24. The drive pulses are applied to the control electrode of the switch transistor 30 connected to primary winding 31A of a pulse transformer 31. The peak-to-peak voltage produced between a pair of electrodes 33 and 34 connected to the secondary winding terminals, respectively, of the pulse transformer 30 corresponds to the pulse width of the drive pulses, and hence to the stimulus level selected by push-button switches 13 of the remote transmitter 11.

Figure 3:
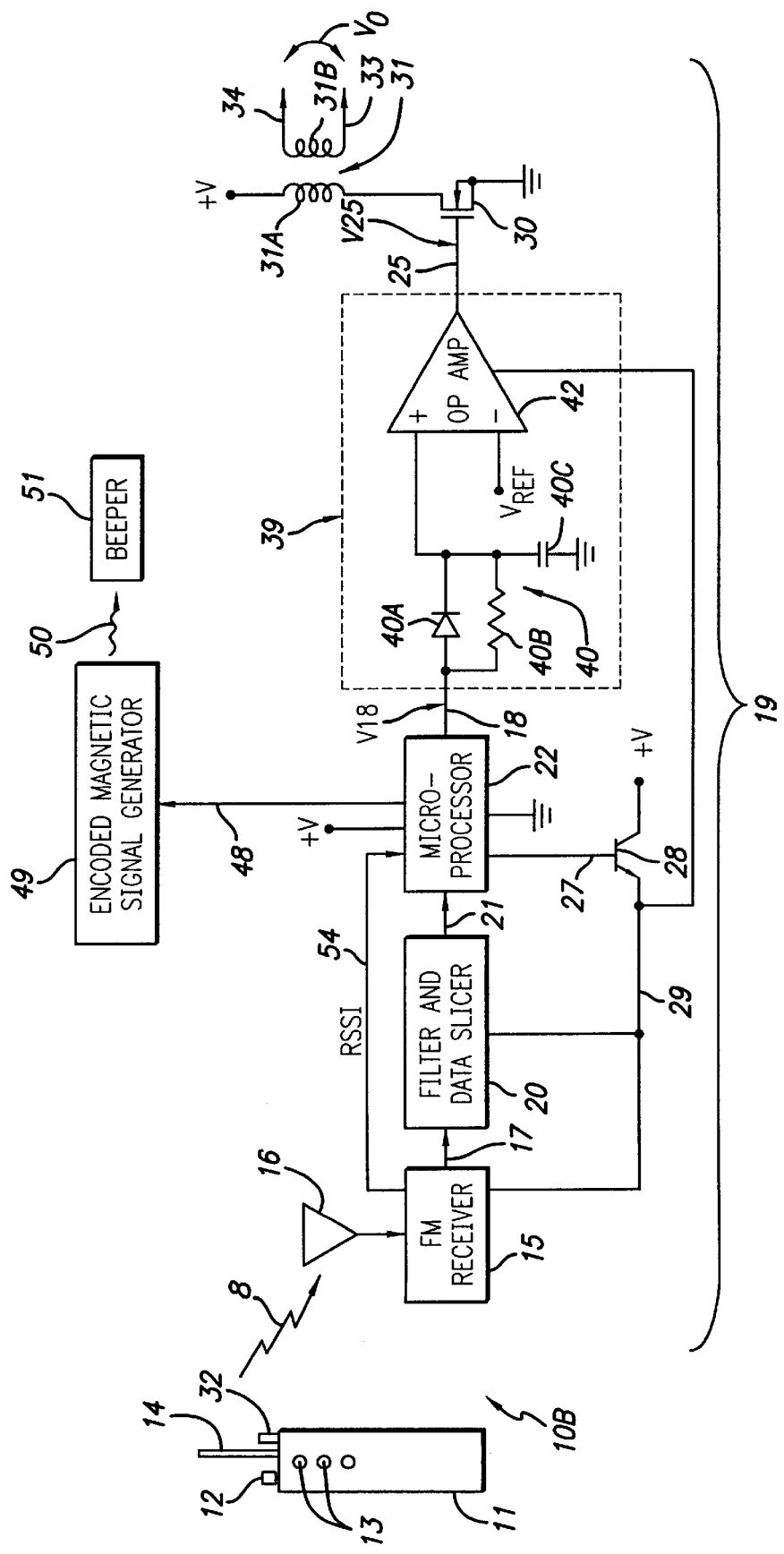
FIG. 3 is a block diagram of a preferred second embodiment of the remote animal training system of the present invention.
Figure 3A:
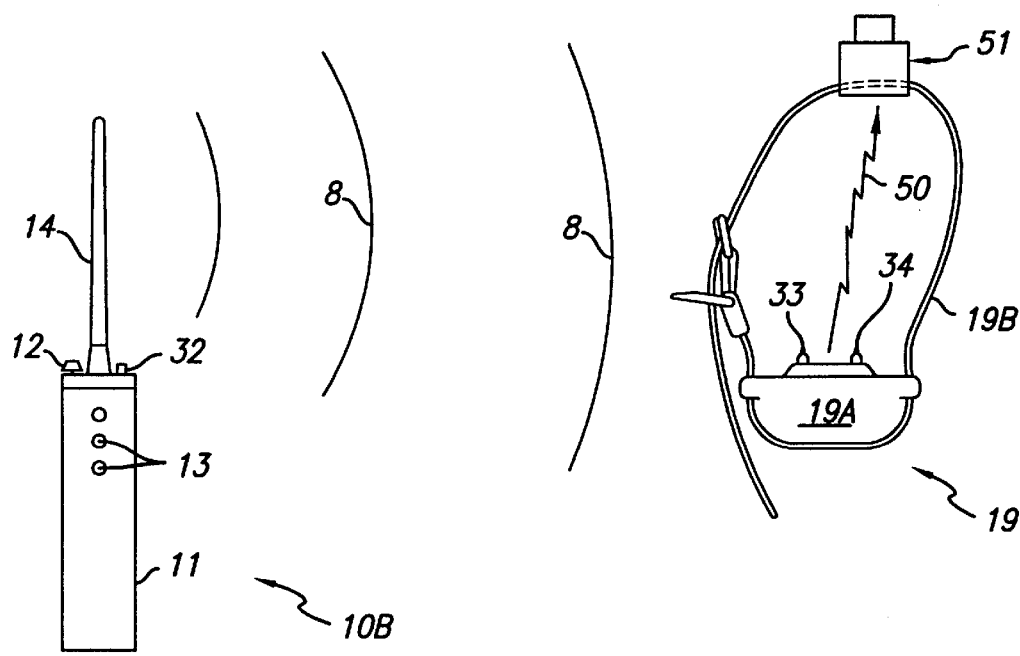
FIG. 3A is a perspective diagram of an implementation of the remote training system of FIG. 3 with the receiver portion mounted on a collar.

Referring to FIGS. 3 and 3A, a preferred remote training system 10B includes a remote transmitter 11 which sends remotely selectable control signals to a collar-mounted receiver unit 19 carried by the animal. Receiver unit 19 includes a receiver 19A attached to the bottom of a collar 19B. A beeper unit 51 is attached to the upper portion of collar 19B. The electrodes 33 and 34 of receiver unit 19 electrically contact the skin of the animal and apply thereto stimulus signals the intensity of which are controlled by the remote transmitter 11. The collar-mounted beeper unit 51 can be actuated by a switch 32 on transmitter 11 to produce a relatively loud beeping sound that enables the trainer to audibly determine if the dog is moving or is motionless, i.e., "pointing".

A 7-position rotary switch 12 on transmitter 11 selects a "zero" level or any one of six desired output pulse amplitude levels of the pulses of stimulus voltage $V_0$ produced by transformer 31. Several push button "transmit" switches 13 can be depressed individually or in combination to select the frequency and number of the pulses of stimulus voltage signal $V_0$.

Figure 5:
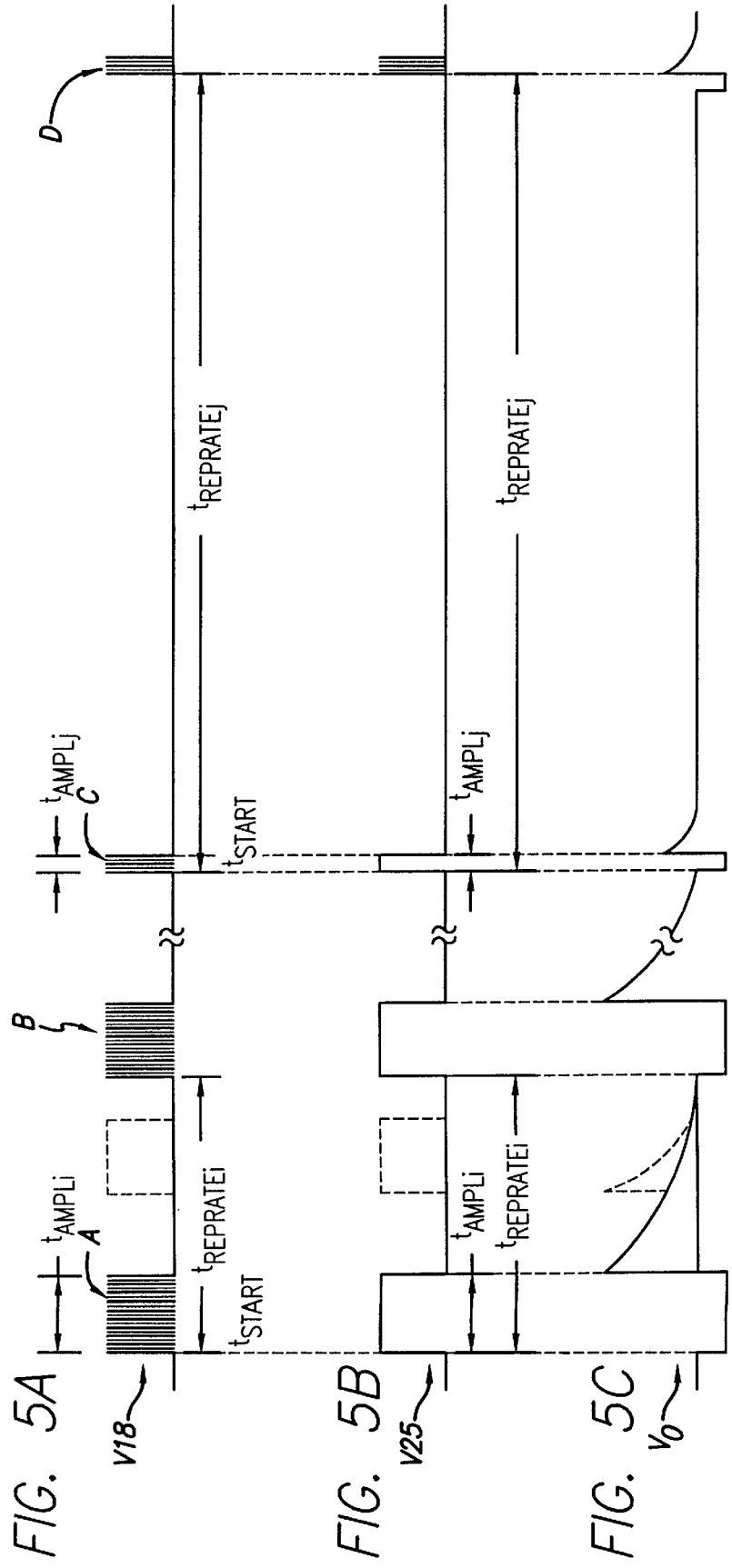
FIGS. 5A–5D are diagrams illustrating waveforms of several signals in the system of FIG. 3.
Figure 6:
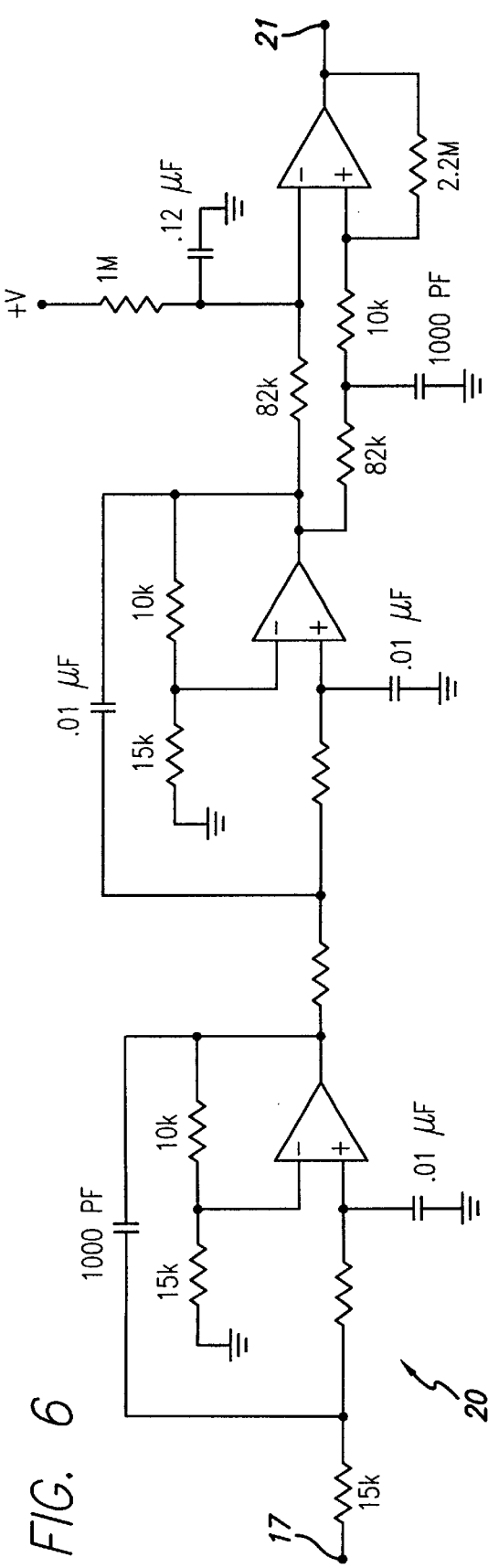
FIG. 6 is a detailed circuit diagram of the filter/data slicer circuit in block 20 of FIG. 3.

Remote transmitter 13 and FM receiver 15 of FIG. 3 are similar to those in FIG. 2. The output 17 of FM receiver 15 in FIG. 3 is connected to the input of a filter and data slicer circuit 20. An output of filter and data slicer circuit 20 provides a serial digital encoded input signal on conductor 21 as a data input to microprocessor 22. Filter and data slicer circuit 20 is a very conventional circuit that simply filters and shapes the signals produced by FM receiver 15 to produce corresponding digital pulses on conductor 21 as an input to microprocessor 22. The details of filter and data circuit slicer 20 are shown in FIG. 5.

Microprocessor 22 supplies a signal V18 on conductor 18 that includes a frequency-modulated stream of output pulses, all of the same pulse width, just as in the above described remote training system 10A of FIG. 2. However, in FIG. 3 a filter circuit 39 including an integrator circuit 40 and an operational amplifier 42 filters the frequency-modulated stream of constant width pulses on conductor 18 to produce a drive signal V25 on conductor 25. Drive signal 25 includes pulses the widths of which correspond to the stimulus levels selected by switch 12 of remote transmitter 11. Drive signal V25 is applied to the gate of primary winding current switch MOSFET 30, which operates as described above to control the durations of the currents in primary winding 31A, and hence controls the amplitudes of the pulses of stimulation voltage $V_0$ between skin-contacting electrodes 33 and 34.

Integrator circuit 40 of filter 39 includes a diode 40A having its anode connected to conductor 18 and its cathode connected to the (+) input of operational amplifier 42. A 2.3 kilohm resistor 40B is connected in parallel with diode 40A. A 100 picofarad capacitor 40C is connected between ground and the (+) input of operational amplifier 42, the (−) input of which is connected to a reference voltage $V_{REF}$.

Table 1 shows the various states of digital intensity bits I3, I2, and I1 produced by filter and data slicer circuit 20 and provided as an input to microprocessor 22 as a function of the previously mentioned zero and six intensity level settings which can be remotely selected by switch 12 on transmitter 11.

TABLE 1

| Selected Stimulation Intensity | I3 | I2 | I1 | $t_{AMPLi}$ |
| --- | --- | --- | --- | --- |
| 0 | 0 | 0 | 0 | — |
| 1 | 0 | 0 | 1 | 40 μsec |
| 2 | 0 | 1 | 0 | 110 μsec |
| 3 | 0 | 1 | 1 | 170 μsec |
| 4 | 1 | 0 | 0 | 220 μsec |
| 5 | 1 | 0 | 1 | 300 μsec |
| 6 | 1 | 1 | 0 | 720 μsec |

Figure 4:
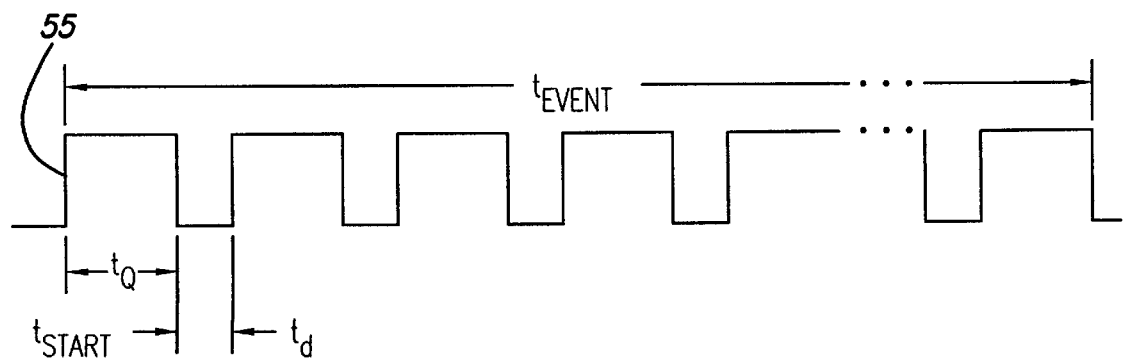
FIG. 4 is a timing diagram useful in describing the operation of the system of FIG. 3.

Referring to FIG. 4, reference numeral 55 designates the timing of the stimulation intervals produced by the system of FIG. 3. The stimulus pulses that occur during the interval $t_{EVENT}$ constitute a particular stimulus event. The interval $t_{EVENT}$ typically is a timed out maximum of approximately 9–12 seconds, and usually is determined by how long the trainer depresses one or more of switches 13 on transmitter 11. Each stimulus interval $t_Q$ may be approximately 120 milliseconds. A large number of individual microsecond pulses 44 (FIG. 5D) referred to as "10 millisecond pulses" are produced by microprocessor 22 on conductor 18 during each interval $t_Q$. FIG. 5D illustrates such 10 microsecond pulses which constitute pulse A in the V18 waveform of FIG. 5A. Actually, in the present embodiment, each positive-going pulse 44 in FIG. 5D is actually 9 microseconds wide and each negative-going pulse 45 is 1 microsecond wide, so is the period that is equal to 10 microseconds. The number of such 10 microsecond pulses 44 occurring during each interval $t_Q$ is determined by the presently selected stimulus intensity settings selected by switch 12 on transmitter 11. At the end of each stimulus interval $t_Q$, a "quiet time" delay of $t_d$ occurs during which no 10 microsecond pulses 44 are produced by microprocessor 22. This "quiet time" allows one microsecond for the rf signals 8 from transmitter 11 to be accurately detected by receiver 15 without the possibility of any radio frequency interference from output transformer 31.

Referring to FIG. 5A, waveform V18 illustrates an example of a sequence of bursts of the above described 10 microsecond pulses 44 produced by microprocessor 22 during each stimulus interval $t_Q$. Each burst of 10 microsecond pulses 44 lasts for a duration $t_{AMPLi}$, beginning at a time $t_{START}$ that occurs when the trainer actuates at least one of switches 13 of transmitter 11. The number of 10 microsecond pulses 44, and hence the burst duration of $t_{AMPLi}$, is determined by the present stimulus intensity setting of switch 12 on transmitter 11, and may very from approximately 4 pulses ($t_{AMPLi}$=40 milliseconds) to approximately 50 pulses ($t_{AMPLi}$=500 milliseconds), or more if needed. The durations $t_{AMPLi}$, which are shown above in Table 1, determine the widths of the pulses on conductor 25 and hence the durations of the currents in primary winding 31A. The durations of the primary winding currents determine the amplitudes of the stimulus voltage pulses of the stimulus signal $V_0$ between skin-contacting electrodes 33 and 34.

For convenience, two different examples of the waveforms on conductor 18 are shown in FIG. 5A. In the first example, which includes pulse bursts A and B in FIG. 5A, a relatively large number of the 10 microsecond pulses occurs during the burst interval $t_{AMPLi}$, and a relatively short repetition period $t_{REPRATEi}$ is also shown. This combination of $t_{AMPLi}$ and $t_{REPRATEi}$ causes a relatively high level of stimulation intensity, including relatively large amplitude stimulus pulses with a relatively high repetition rate. In the second example, which includes pulse bursts B and D in FIG. 5A, the trainer will have decreased the stimulation intensity setting on transmitter 11 so fewer of the microsecond pulses 44 occur during a burst of shorter duration $t_{AMPLj}$, with a longer period $t_{REPRATEj}$.

The frequency of the pulse bursts A and B is equal to the inverse of $t_{REPRATEi}$ in FIG. 5A, and is determined by the combination of switches 13 presently depressed on transmitter 11. The repetition rate of the pulse bursts can vary from approximately 15 Hz to approximately 300 Hz.

FIG. 5B shows a typical waveform produced on conductor 25 as a result of the filtering of the waveform 56 of FIG. 5A (on conductor 18) by filter 39. The resulting pulses of stimulus voltage $V_0$ produced by transformer 31 between electrodes 33 and 34 is shown in FIG. 5C.

FIG. 5C shows a waveform $V_0$ of the stimulus voltage waveform 61 produced between electrode contacts 33 and 34 corresponding to the waveforms V18 and V25 in FIGS. 5A and 5B, respectively.

Figure 9:
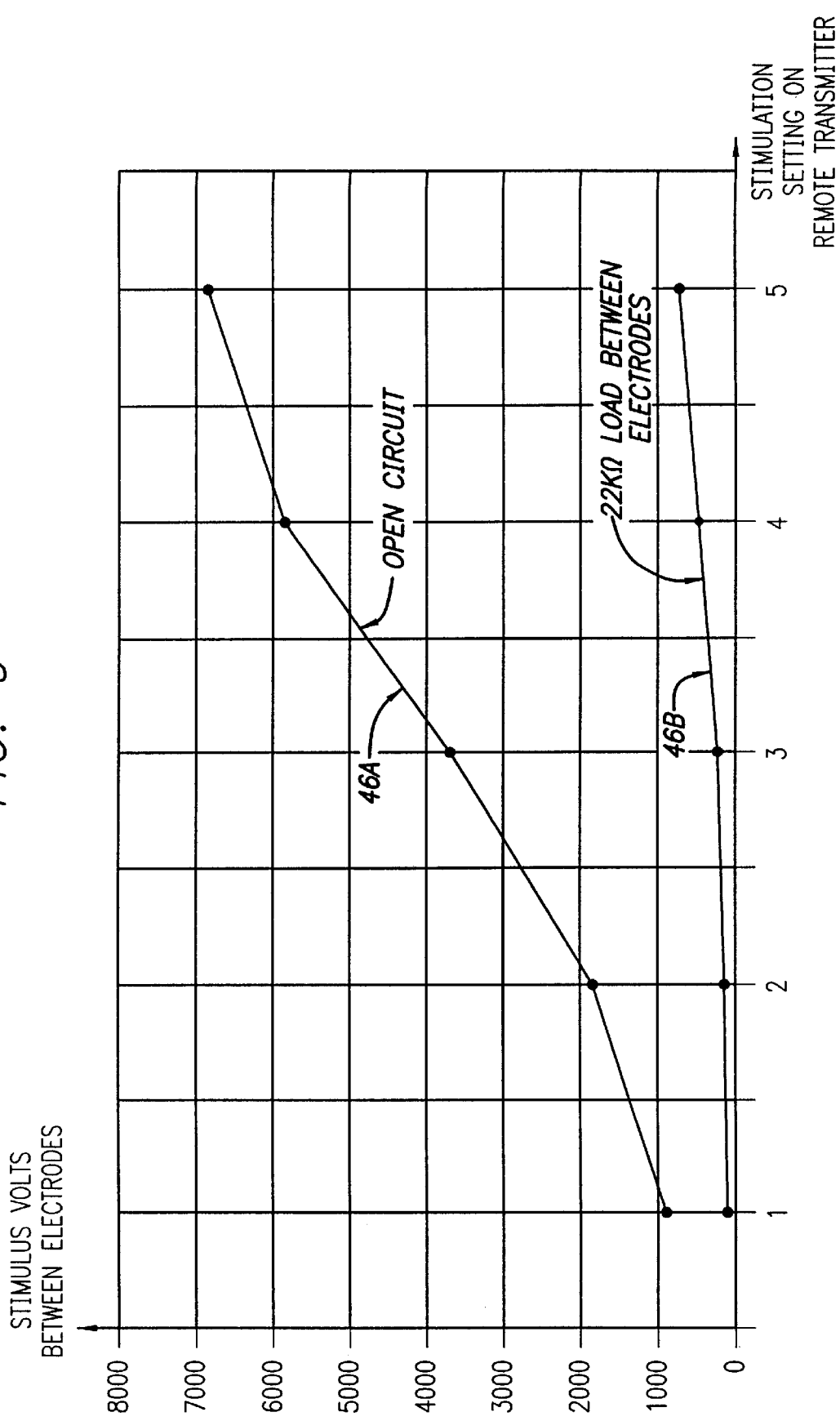
FIG. 9 is a graph including several plots of stimulus voltage as a function of intensity settings of the remote transmitter.

The above described embodiment of FIG. 3 provides a greatly improved range of remotely selectable stimulus intensities, and also provides improved reliability and repeatability of the stimulus pulse sequence applied to the animal being trained, by providing high levels of both open circuit voltages and loaded output voltages between the electrodes 33 and 34, as shown in FIG. 9.

The "open circuit" voltage is the amplitude of the pulses of the stimulus voltage $V_0$ produced between electrodes 33 and 34 by secondary winding 31B, and the "loaded" voltage is the amplitude of voltage between electrodes 33 and 34 when the two electrodes 33 and 34 are both effectively electrically contacting the animal's skin. Curve 46A of FIG. 9 shows a graph of the open circuit voltage data for the system of FIG. 3 as a function of the remote intensity control setting. Curve 46B shows the "loaded" stimulus voltage. The system of FIG. 3 thus provides reliable, effective stimulus for each of the setting levels 1 through 6. This is in contrast to the prior devices having remotely selectable amplitudes of the stimulus signals because such prior devices have been unable to provide effective electrode contact to the animal's skin for low stimulus intensity settings.

Figure 8:
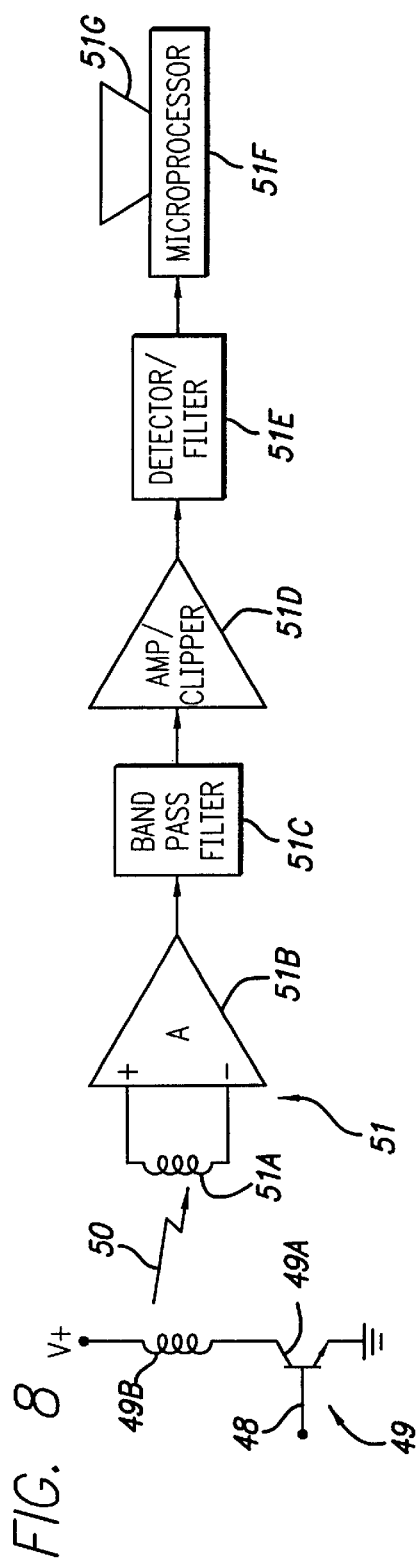
FIG. 8 is a diagram of the encoded magnetic signal generator 49 and beeper 51 in FIG. 3.

Referring again to FIG. 3, microprocessor 22 provides a digital signal via conductor 48 to an encoded magnetic signal generator circuit 49, the details of which are shown in FIG. 8. (An advantage to using a magnetic signal is that it is easy to comply with FCC regulations; however, a low power rf signal could be used instead.) Referring to FIG. 8, the magnetic encoder circuit 49 includes a transistor 49 A with its base connected to conductor 48, its emitter connected to ground, and its collector connected to one terminal of an inductor 49B, the other terminal of which is connected to +V. The encoded digital signal has the form indicated in FIG. 8B, in which a 4.5 millisecond burst of a 4 kilohertz squarewave followed by a 4 millisecond space representative of "1", and a 9 millisecond burst of the 4 kilohertz squarewave followed by the space represents a "0".

The encoded magnetic signal represents the address of a receiver unit which stores a matching address. If the matching address is received, beeper unit 51 is turned on and remains on until the matching encoded address is received again, which turns beeper unit 51 off. While beeper unit 51 is on, it operates in a mode selected by internal DIP switches (not shown). In one selectable mode, two different beeping patterns correspond to two different dogs. In another selectable mode, beeping sounds are emitted only when a motion detector within the beeper unit 51 detects motion by the dog. In another selectable mode, beeping occurs only when the dog is motionless.

Beeper unit 51 of FIG. 8 includes an inductor 51A which receives the magnetic signal 50 produced by inductor 49B and produces a corresponding signal which is amplified by amplifier 51B to replicate the digital address supplied on conductor 48. The output of amplifier 51B is filtered and shaped by band pass filter 51C, amplifier/clipper circuit 51D, and detector/filter circuit 51E in order to replicate the encoded digital signal on conductor 48 at an input to a microprocessor 51F, which can be a PIC12C509-04I CMOS microprocessor from Microchip Technology, Inc. Microprocessor 51F then causes a speaker 51G to emit beeping sounds to inform the trainer that the dog is moving or stationary.

Typical dog behavior is so vigorous that breakage of conductor wires in electric dog training systems is often a major problem. The above described wireless communication of the encoded address by magnetic signal 50 avoids this reliability problem.

Figure 8A:
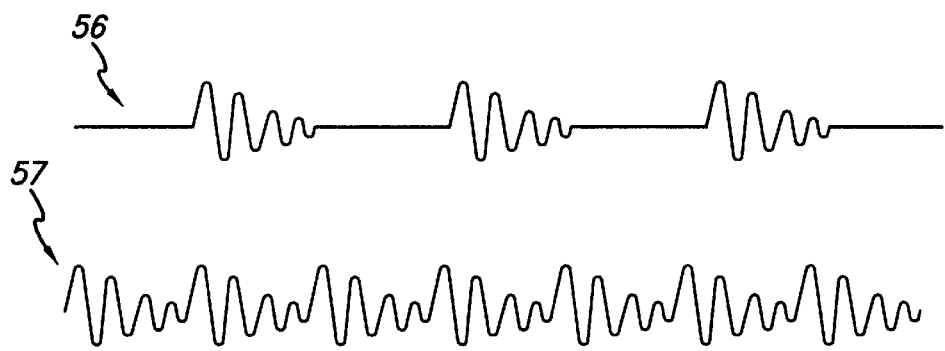
FIG. 8A is a timing diagram useful in explaining the operation of the circuit of FIG. 7A.
Figure 8B:
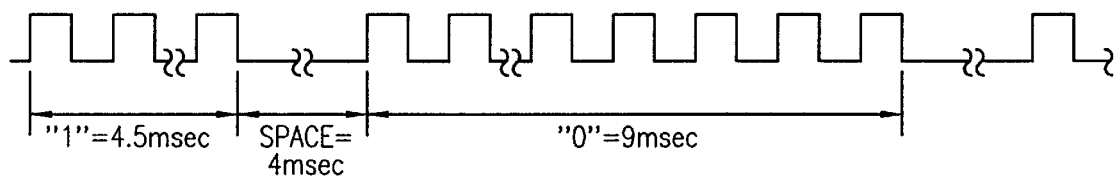
FIG. 8B is another timing diagram useful in explaining the operation of the circuit of FIG. 7A.

FIG. 8A shows two noise waveforms 56 and 57 which could cause undesired digital signals to be input to microprocessor 51F if the address supplied on conductor 48 were not encoded as described above. Noise waveform 56 is produced by transformer 31 when it produces stimulus signal $V_0$, and noise waveform 57 represents ambient random noise. Both noise waveforms can be filtered and/or shaped into digital error signals which appear on digital input of microprocessor 51F. The use of magnetic signal 50 eliminates the use of a metal conductor between receiver circuit 19A and beeper circuit 51, and avoids a major reliability problem that would be caused by breakage of such a wire conductor.

In FIG. 3, microprocessor 22, which can be a low power CMOS 8-bit microprocessor such as a PIC16LC711-04I available from Microchip Technology, Inc., operates in an idle loop when receiver unit 19 is in its low power or "sleep" mode to produce a power-up signal on conductor 27 every 3.5 seconds to the base of an NPN transistor 28 having its collector connected to +V. This enables FM receiver 15 to detect any sufficiently strong rf signal that might be present, as subsequently described. The emitter of transistor 28 is connected to a power conductor 29 that supplies power to FM receiver 15, filter and data slicer 20, and operational amplifier 42. If rf control signal 8 from transmitter 11 is present, transistor 28 is kept on for as long as the signal 8 continues to be present. If no signal 8 is detected, transistor 28 is turned off for another 3.5 seconds, to conserve power supplied by a battery connected to supply the +V voltage in receiver 19A.

In the above mentioned idle loop, microprocessor 22 generates a brief power up signal on conductor 27 every 3½ seconds to allow microprocessor 22 to test the strength of any rf signal 8 that might be present by reading the value of a digital receiver signal strength indicator signal on RSSI conductor 54, which is connected to an analog input port of microprocessor 22. Microprocessor 22 includes an internal analog-to-digital converter that allows microprocessor 22 to accurately measure the signal strength indicator signal RSSI. If microprocessor 22 determines that a sufficiently strong rf signal 8 is present, microprocessor 22 maintains the power up signal on conductor 27 so as to keep FM receiver 15 and filter and data slicer 20 powered up long enough to evaluate the encoded information contained in rf signal 8 and determine if the receiver unit 19 is the one being addressed by remote transmitter 11. This determination may require from 1 to 3 seconds. If the receiver unit 19 is the one being addressed, microprocessor 22 maintains the power on signal on conductor 27 so that the various stimulus intensity codes and beeper codes received and demodulated to provide the digital signal on conductor 21 can be processed and converted into the above mentioned signals V18 on conductor 18, and so the encoded beeper address signals on conductor 48 can be utilized as described above to turn beeper unit 51 on and off.

The RSSI signal on conductor 54 must have a value such that a remote transmitter more than approximately 10 feet away is incapable of switching receiver unit 19 into its power on or "wake up" mode. If a sufficient rf signal level is not indicated by the analog RSSI signal on conductor 54, microprocessor 22 discontinues the power up signal on conductor 27 after approximately 300 milliseconds. Microprocessor 22 can only "power up" receiver unit 19 by turning power transistor 28 on or "power down" receiver unit 19 by turning power transistor 28 off if seven-position rotary switch 12 is at its "0" position. Neither the "power up" or "power down" operation can occur unless transmitter 11 is less than approximately 10 feet from receiver unit 19 because otherwise the RSSI signal on conductor 54 will be too low. Microprocessor 22 reads the value of the RSSI signal only if rotary switch 12 is at its "0" setting and only for the purpose of determining whether to change the level of the signal on conductor 27 to turn power control transistor 28 on and off. Once receiver unit 19 has been powered up, it remains powered up for all stimulus producing operations, until rotary switch 12 is returned to its "0" position and a power down signal is received from transmitter 11 while it is less than 10 feet from receiver unit 19. The idle loop in which microprocessor 22 operates while in the power on mode is much faster, typically repeating approximately every 80 milliseconds, than is the case if receiver unit 19 is in its sleep mode.

FIG. 7A shows the physical structure of transformer 31, which includes a magnetic material core including an upper section 31C and a lower section 31D separated by three air gaps 37. Two apertures 35 and 36 in the core form a left leg, a middle leg, and a right leg as shown. Primary winding 31A is wound around the left leg, and secondary winding 31B is wound around the right leg. The air gaps 37 increase the energy storage of transformer 31, and provide a more linear portion 41A of the current versus RMS output voltage characteristic shown in FIG. 7B. In FIG. 7B, portion 41B of the characteristic curve 41 represents the saturation region of transformer 41. The dashed lines indicate a range of non-linearity which would be present if air gaps 37 were not provided. By operating transformer 31 in the linear region 41A of the characteristic curve 41, a delay 43 shown in FIG. 7C between the flux buildup phase 42 and the flyback portion of the output signal $V_O$ is avoided. Furthermore, a much more accurate, linear relationship between the primary winding current and its duration and the amplitude of the flyback pulse is achieved.

The described embodiments combine the basic remote intensity control techniques of the above mentioned commonly assigned patents by remote control of stimulus pulse widths and/or frequencies with the remote control of the amplitudes of the stimulus pulses, to thereby provide a much wider range of remote stimulus control. This allows a trainer to perform most of the dog training in any session using the lower stimulation intensity levels available on the remote transmitter (which often is the most desirable way to accomplish effective training). However, if training circumstances and/or the dog's behavior abruptly change during the session so that immediate higher intensity stimulus is needed, it is available. There is no need for the trainer to tailor training sessions to a limited range of selectable stimulation intensities, as is required by the prior art. The use of the encoded wireless signals 5 between the receiver unit 19 and the beeper unit 50 makes it practical to combine the beeper unit with the remote training system 10B because the problems of noise signals causing undesired turn on or turn off of the beeper unit 15 is avoided, and because the unreliability caused by broken wire interrupting coupling of signals to the beeper circuit is avoided.

While the invention has been described with reference to several particular embodiments thereof, those skilled in the art will be able to make the various modifications to the described embodiments of the invention without departing from the true spirit and scope of the invention. It is intended that all elements or steps which are insubstantially different or perform substantially the same function in substantially the same way to achieve the same result as what is claimed are within the scope of the invention. For example, additional bursts of pulses A and B in FIG. 5A MAY be provided within a sufficiently long $t_{REPRATEi}$ interval to increase the intensity of stimulation felt by the animal at a particular amplitude of pulses of the output signal $V_O$. The dotted lines in FIGS. 5A, 5B and 5C illustrate this technique. As another example, the circuitry for establishing the various operating modes of beeper unit 51 could be provided in transmitter 11 instead of within beeper unit 1, and the resulting data now generated in beeper 51 by microprocessor 51F instead could be generated in transmitter 10 and transmitted by means of encoded data in rf signal 8, processed by microprocessor 22, and transmitted via conductor 48 and magnetic signals 50 directly to suitable digital-to-analog conversion circuit in a simplified beeper unit which then would drive speaker 51G.

What is claimed is:

1. A method of producing a wide range of stimulus intensities for training an animal using a remote transmitter and a collar-mounted receiver carried by the animal, comprising:

(a) selecting one of a plurality of desired stimulus levels at the transmitter;

(b) transmitting an rf signal representative of the selected desired stimulus level to the receiver;

(c) demodulating the received rf signal in the receiver to produce a digital signal representative of the selected stimulus level and inputting the digital signal to a microprocessor in the receiver;

(d) operating the microprocessor to decode the digital signal to determine a first duration and a second duration;

(e) operating the microprocessor to generate a first stream of pulses on an output bus of the microprocessor, each of the pulses of the first stream being of a third duration, the pulses of the first stream being in periodic groups so the width of each group represents the first duration and the period of the groups represents the second duration;

(f) filtering the first stream of output pulses to produce a second stream of pulses each having a width which corresponds to the first duration, a repetition rate of the pulses of the second stream corresponding to the second duration; and (g) coupling the second stream of pulses to a control electrode of a switch coupled in series with a primary winding of an output transformer of the receiver to repetitively turn the switch on for durations corresponding to the first duration to cause the amplitude of voltage pulses produced between contact electrodes connected to terminals of a secondary winding of the output transformer to correspond to the first duration and to cause the repetition rate of the voltage pulses produced between the contact electrodes to correspond to the second duration.

2. The method of claim 1 including causing the microprocessor to maintain the switch open for a predetermined interval after each pulse of the first stream sufficient to allow the rf signal to be received and demodulated without error due to radio frequency interference from the output transformer.

3. The method of claim 1 wherein in step (d) the microprocessor decodes the first digital signal by using the digital signal as an address for accessing a stored look-up table to obtain values of the first and second durations.

4. The method of claim 1 including providing an air gap in the output transformer to increase the amount of energy stored in a magnetic field of the output transformer.

5. A method of training an animal using a remote transmitter and a collar-mounted receiver carried by the animal, comprising:

(a) selecting one of a first group of stimulus values at the transmitter;

(b) transmitting an rf signal representative of the selected stimulus value of the first group to the receiver;

(c) demodulating the rf signal in the receiver to produce a digital signal representative of the selected stimulus value of the first group and inputting the digital signal to a microprocessor in the receiver;

(d) operating the microprocessor to generate a first stream of pulses on an output bus of the microprocessor, each pulse of the first stream having a constant first width;

(e) filtering the first stream of output pulses to produce a second stream of pulses each having a second width which is representative of the selected stimulus value of the first group; and (f) coupling the second stream of pulses to the control electrode of a switch coupled in series with a primary winding of an output transformer to repetitively turn the switch on for successive durations substantially equal to the second width to cause the amplitude of voltage pulses produced between contact electrodes connected to terminals of a secondary winding of the output transformer to be representative of the selected stimulus value of the first group.

6. The method of claim 5 including causing the microprocessor to maintain the switch open for a predetermined interval after each pulse of the first stream sufficient to allow the rf signal to be received and demodulated without error due to radio frequency interference from the output transformer.

7. The method of claim 5 further including operating the microprocessor to produce the first stream of pulses as a sequence of bursts of pulses, the width of each burst being substantially equal to the second width.

8. The method of claim 7 wherein step (a) includes selecting one of a second group of stimulus values at the transmitter, the method including operating the microprocessor to produce the first stream of pulses as the sequence of bursts wherein the repetition rate of the bursts is representative of the selected stimulus value of the second group, wherein step (b) includes transmitting information representative of the selected stimulus value of the second group to the receiver, wherein step (c) includes demodulating the received information in the receiver to produce the digital signal to represent the selected stimulus value of the second group and inputting the digital signal to the microprocessor, and wherein step (d) includes operating the microprocessor to generate the sequence of bursts at a repetition rate representative of the selected stimulus value of the second group.

9. The method of claim 8 wherein both the duration of the bursts and the amplitude of the voltage pulses are representative of the selected stimulus value of the first group.

10. A system for remote training of an animal, comprising:

(a) a transmitter including a control apparatus for selecting a first one of a plurality of desired intensity levels to cause the transmitter to transmit an rf signal representative of the first intensity level;

(b) a collar-mounted receiver unit including a receiver circuit and a demodulator operative to produce a digital signal representative of the first intensity level;

(c) a microprocessor adapted to receive the digital signal and, in response thereto, produce a first stream of pulses, the first stream being in the form of a sequence of bursts, the width of each burst being equal to a first width representative of the first intensity level, each pulse of the first stream having a constant second width;

(d) a filter circuit adapted to filter the first stream of pulses to produce a second stream of pulses the width of each pulse of the second stream being substantially equal to the first width; and (e) a switch having a control electrode coupled to respond to the second stream of pulses to repetitively couple a primary winding of an output transformer between first and second reference voltages to cause the amplitude of voltage pulses of a stimulus signal produced between terminals of a secondary winding of the transformer to be representative of the first width and hence of the first intensity level.

11. The system of claim 10 wherein the demodulator produces the digital signal to represent a second intensity level, and the microprocessor is adapted to produce the bursts at a repetition rate representative of the second intensity level.

12. The system of claim 11 wherein the switch includes a MOSFET having its source coupled to the second reference voltage, its drain coupled to a terminal of the primary winding, and its gate coupled to receive the second stream of pulses.

13. The system of claim 12 wherein the filter circuit includes a diode having an anode coupled to receive the first stream of pulses, a resistor coupled in parallel with the diode, an anode of the diode being coupled to a first input of an operational amplifier, a capacitor coupled between the first input of the operational amplifier and a fixed voltage, a second input of the operational amplifier being coupled to a reference voltage, an output of the operational amplifier producing the second stream of pulses.

14. The system of claim 11 wherein the control apparatus includes a first switch device adapted to select the first intensity level from a first group of intensity levels.

15. The system of claim 14 wherein the control apparatus includes a second switch device adapted to select the second intensity level from a second group of intensity levels.

16. The system of claim 11 including a power switch adapted to couple the first reference voltage to the receiver circuit, the demodulator, and the filter circuit in response to the microprocessor, wherein the receiver circuit produces an indicator signal representative of the level of the rf signal, and the microprocessor includes an analog input port, the microprocessor operating in an idle loop to periodically turn on the power switch to power up the receiver circuit, measure the indicator signal, and maintain the power switch on if the indicator signal exceeds a predetermined threshold.

17. The system of claim 10 wherein the demodulator includes a filter and data slicer circuit adapted to filter and shape an output of the receiver circuit to produce a digital signal representative of information in the rf signal.

18. The system of claim 10 including:
a signal generator circuit coupled to the microprocessor to receive an encoded beeper address signal;
a beeper unit mounted on the same collar as the receiver unit and adapted to receive a signal from the signal generator circuit.

19. The system of claim 18 wherein the signal from the signal generator circuit is a wireless signal and wherein the signal generator circuit is a magnetic signal generator circuit and is included in a receiver housing of the receiver unit, and the beeper unit is mounted on a different part of the collar than the receiver housing.

20. A system for producing a wide range of stimulus intensities for training an animal using a remote transmitter and a collar-mounted receiver carried by the animal, comprising:
(a) a switch apparatus on the transmitter adapted to select one of a plurality of desired stimulus levels to cause the transmitter to transmit a wireless signal representative of a selected desired stimulus level to the receiver;
(b) a microprocessor in the receiver;
(c) means for demodulating the received information in the receiver to produce a first digital signal representative of the selected stimulus level and inputting the first digital signal to the microprocessor;
(d) means for operating the microprocessor to decode the first digital signal to determine a first duration and a second duration;
(e) means for operating the microprocessor to generate a first stream of pulses on an output bus of the microprocessor, each of the pulses of the first stream being of a third duration, the pulses of the first stream being in periodic groups so the width of each group represents the first duration and the period of the groups represents the second duration;
(f) a filter adapted to filter the first stream of output pulses to produce a second stream of pulses each having a width which corresponds to the first duration, wherein a repetition rate of the pulses of the second stream corresponds to the second duration;
(g) a transformer having a primary winding and a secondary winding; and
(h) a switch coupling the primary winding between first and second supply voltages in response to the second stream of pulses to repetitively produce currents in the primary winding for durations corresponding to the first duration to cause the amplitude of voltage pulses produced between contact electrodes connected to terminals of the secondary winding to correspond to the first duration and to cause the repetition rate of the voltage pulses to correspond to the second duration.

21. A method of producing a wide range of stimulus intensities for training an animal using a remote transmitter and a collar-mounted receiver carried by the animal, comprising:
(a) selecting one of a plurality of desired stimulus levels at the transmitter;
(b) transmitting an rf signal representative of the selected desired stimulus level to the receiver;
(c) demodulating the received rf signal in the receiver to produce a digital signal representative of the selected stimulus level and inputting the digital signal to a state machine circuit in the receiver;
(d) operating the state machine circuit to decode the digital signal to determine a first duration and a second duration;
(e) operating the state machine circuit to generate a first stream of pulses on an output bus of the state machine circuit, each of the pulses of the first stream being of a third duration, the pulses of the first stream being in periodic groups so the width of each group represents the first duration and the period of the groups represents the second duration;
(f) filtering the first stream of output pulses to produce a second stream of pulses each having a width which corresponds to the first duration, a repetition rate of the pulses of the second stream corresponding to the second duration; and
(g) coupling the second stream of pulses to the control electrode of a switch coupled in series with a primary winding of an output transformer of the receiver to repetitively turn the switch on for durations corresponding to the first duration to cause the amplitude of voltage pulses produced between contact electrodes connected to terminals of a secondary winding of the output transformer to correspond to the first duration and to cause the repetition rate of the voltage pulses produced between the contact electrodes to correspond to the second duration.

22. A method of training an animal using a remote transmitter and a collar-mounted receiver carried by the animal, comprising:

(a) selecting one of a first group of stimulus values at the transmitter;

(b) transmitting an rf signal representative of the selected stimulus value of the first group to the receiver;

(c) demodulating the rf signal in the receiver to produce a digital signal representative of the selected stimulus value of the first group and inputting the digital signal to a state machine circuit in the receiver;

(d) operating the state machine circuit to generate a first stream of pulses on an output bus of the state machine circuit, each pulse of the first stream having a constant first width;

(e) filtering the first stream of output pulses to produce a second stream of pulses each having a second width which is representative of the selected stimulus value of the first group; and (f) coupling the second stream of pulses to the control electrode of a switch coupled in series with a primary winding of an output transformer to repetitively turn the switch on for successive durations substantially equal to the second width to cause the amplitude of voltage pulses produced between contact electrodes connected to terminals of a secondary winding of the output transformer to be representative of the selected stimulus value of the first group.

* * * * *